(12) United States Patent
Rachui et al.

(10) Patent No.: US 6,675,431 B1
(45) Date of Patent: Jan. 13, 2004

(54) TUBULAR PLATE AND CORRESPONDING PRODUCTION METHOD

(75) Inventors: Dirk Rachui, Eisenach (DE); Tino Boos, Baden-Baden (DE); Georg Bodendorf, Brotterode (DE); Rolf Bischof, Fischbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,622

(22) PCT Filed: Nov. 11, 1999

(86) PCT No.: PCT/DE99/03590

§ 371 (c)(1),
(2), (4) Date: Nov. 24, 2000

(87) PCT Pub. No.: WO00/46081

PCT Pub. Date: Aug. 10, 2000

(30) Foreign Application Priority Data

Feb. 3, 1999 (DE) .......................................... 199 04 155

(51) Int. Cl.[7] .................................................. B60S 1/34
(52) U.S. Cl. ................ 15/250.3; 15/250.31; 15/250.27; 264/264; 264/279
(58) Field of Search .......................... 15/250.3, 250.31, 15/250.27; 296/96.15; 403/265, 269; 425/112, 116, 127, 129.1; 264/264, 279

(56) References Cited

U.S. PATENT DOCUMENTS

| 3,762,453 | A | | 10/1973 | Merrow et al. ................. 81/22 |
| 5,648,036 | A | * | 7/1997 | Glang et al. ................. 264/264 |
| 6,196,754 | B1 | * | 3/2001 | Bruemmer et al. ...... 15/250.31 |
| 6,209,373 | B1 | * | 4/2001 | Muehlpforte et al. ...... 15/250.3 |

FOREIGN PATENT DOCUMENTS

| DE | 196 39 559 A1 | 4/1998 |
| EP | 0 690 242 A | 1/1996 |
| EP | 0 704 356 A | 4/1996 |
| EP | 0 704 357 A | 4/1996 |

* cited by examiner

*Primary Examiner*—Theresa T. Snider
(74) *Attorney, Agent, or Firm*—Michael J. Striker

(57) ABSTRACT

The invention relates to a tube mounting, in particular of a windshield wiper system of motor vehicles, having a mounting tube (12) which has a hollow profile that on at least one of its free ends (13, 14) has a plastic bearing (15) for receiving a wiper shaft, the bearing (15) being extruded onto the at least one free end (13) of the mounting tube (12). It is proposed that the mounting tube (12) is closed on its at least one free end (13) by a sealing plug (22), which prevents injection molding composition from entering and supports the mounting tube (12) from the inside against the injection pressure.

18 Claims, 3 Drawing Sheets

TUBULAR PLATE AND CORRESPONDING PRODUCTION METHOD

BACKGROUND OF THE INVENTION

The invention relates to a tube mounting, in particular of a windshield wiper system of motor vehicles.

Tubular mountings for windshield wiper systems of motor vehicles are known. In general, they comprise a retaining device, also known as a sheet-metal mounting, which is built up from a retaining element, embodied as a tube, with a motor mount welded onto it. The motor mount serves to receive and secure the motor required to drive the wiper system. The tube mounting is secured in stationary fashion to the vehicle body and on both of its free ends has bearings, each for receiving one wiper shaft, to which the wiper arm with the wiper blade is secured.

From German Patent Disclosure DE 196 39 559 A1, a tube mounting is known that on at least one of its two free ends has a bearing for receiving a wiper shaft; the bearing is mounted on at least one free end of the tube mounting by injection molding technology, in particular being extruded on.

The end of the mounting tube onto which the bearing is extruded is closed by being compressed. This prevents injection molding material from getting into the tube interior during the injection molding process. It proves to be disadvantageous here that during the injection molding process the mounting tube is exposed to the high injection pressure, and thus is deformed in the mold during the injection molding; the deformation has both elastic and plastic components. The respective deformations always differ from one another, and thus changes in the outside volume of the tube are unpredictable. In this respect, it proves to be disadvantageous that the volume to be extruded is accordingly quite variable, and for constant fill amounts, the different amounts filling the mold impair the dimensional stability of the bearing and its fastening to the mounting tube.

SUMMARY OF THE INVENTION

The tube mounting according to the invention has the advantage that the mounting tube is supported from inside by the sealing plug, thus increasing the resistance to compression of the mounting tube during the injection molding process. As a consequence, the clearance of the mounting tube decreases only insignificantly during the injection molding operation, and thus the fill quantity to be injected can be well adapted to the volume to be filled, thus assuring good dimensional stability of the bearing. The invention advantageously provides that the end of the mounting tube onto which the bearing is extruded is closed by the sealing plug. This first prevents injection molding material from getting into the tube interior. The invention also provides that the end of the mounting tube onto which the bearing is to be extruded is embodied in combination with the sealing plug in such a way that shifting, tearing off or twisting of the bearing on or from the mounting tube is impossible. According to a first variant, the invention provides for suitable perforation of a free end of the mounting tube onto which a bearing is to be extruded. The sealing plug inserted into the open end of the mounting tube has recesses in the region of its circumference, and one or more perforation of the mounting tube face these recesses. The at least one hole in the mounting tube and the recess in the sealing plug are disposed in such a way relative to one another and designed in such a way in terms of size that the edges of the holes protrude at least partway past the recesses, thus forming undercuts inside the mounting tube. During the injection molding, injection molding composition flows into these undercuts, creating a secure, positive connection between the mounting tube and the bearing.

In a further advantageous feature of the invention, the sealing plug, also provided with recesses on a certain portion of its surface, is located on the end of the mounting tube onto which the bearing is extruded. The tube is indented in such a way that the surface of the tube at least partly rests on the recesses of the sealing plug. As a result, the connection between the sealing plug and the mounting tube is positive. The bearing extruded around this indented end of the mounting tube, given suitable shaping of the indentations of the tube, is thus lent a twist-proof seat on the end of the mounting tube from which it cannot be torn off.

According to the invention, the sealing plug is designed on its surface resting on the inside of the mounting tube in such a way that it seals off the tube interior from any invading injection molding composition. The sealing plug also braces the tube interior against the injection pressure, so that no impermissible deformations occur.

To make the bracing of the mounting tube against the injection pressure feasible according to the invention, the length of the sealing plug in the mounting tube is at least as great as the length of the extension of the bearing on the mounting tube.

Further advantageous features of the invention can be learned from the dependent claims.

The method for producing the tube mounting according to the invention is characterized in that the at least one free end of the mounting tube is closed by the sealing plug, then placed in a mold, and after the closure of the mold spray-coated by the injection molding composition, thus forming the bearing.

Further advantageous method steps for producing the tube mounting of the invention can be learned from the dependent claims pertaining to the method.

BRIEF DESCRIPTION OF THE DRAWINGS

The invention will be described in further detail in terms of the exemplary embodiments in conjunction with the drawings.

DETAILED DESCRIPTION OF THE PREFERRED EMBODIMENTS

Figure 1:
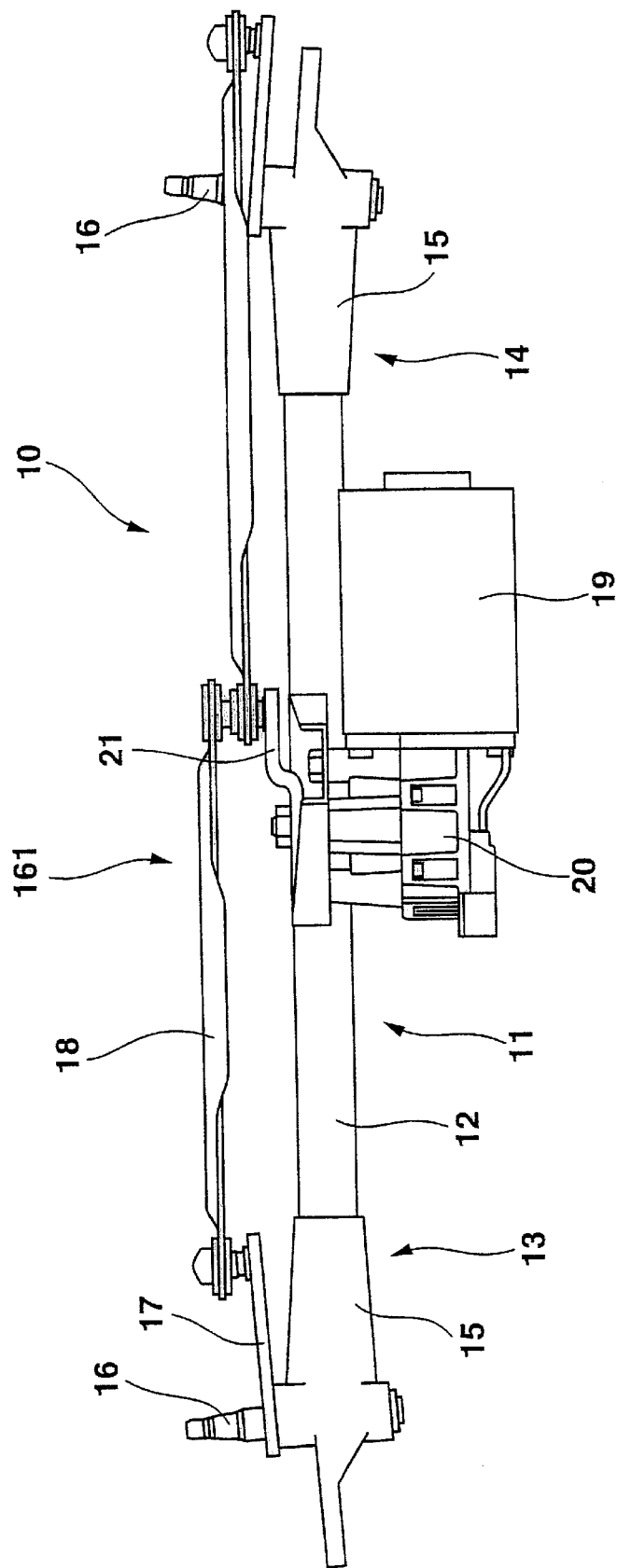
FIG. 1 shows a tube mounting according to the invention for a windshield wiper system of motor vehicles.

FIG. 1 shows a drive system 10 for motor vehicle windshield wipers. The drive system has a tube mounting 11, which can be disposed stationary in a motor vehicle. A mounting tube 12 is part of the tube mounting 11 and on each of its two ends 13 and 14 it is provided with a respective bearing 15 for a wiper shaft 16. The bearings 15, which substantially comprise plastic, are extruded onto the free ends 13 and 14 of the mounting tube 12 using injection molding technology. The wiper shaft 16 is disposed so as to be rotationally movable but axially fixed. It protrudes to both sides past the bearing 15, and a coupling rod system 161 engages one end of the wiper shaft 16. The coupling rod system 161 includes a first coupling rod 17 and a second coupling rod 18, which are connected to one another so as to be rotationally movable. The coupling rod 17 is connected to the wiper shaft 16 in a manner fixed against relative rotation. The drive system 10 also has a drive motor 19, which via a gear 20 drives a crank 21. The crank 21 is connected to the coupling rods 17.

A wiper arm that has a wiper blade can be secured to the end of the wiper shaft 16 that protrudes out of the bearing 15.

Figure 2:
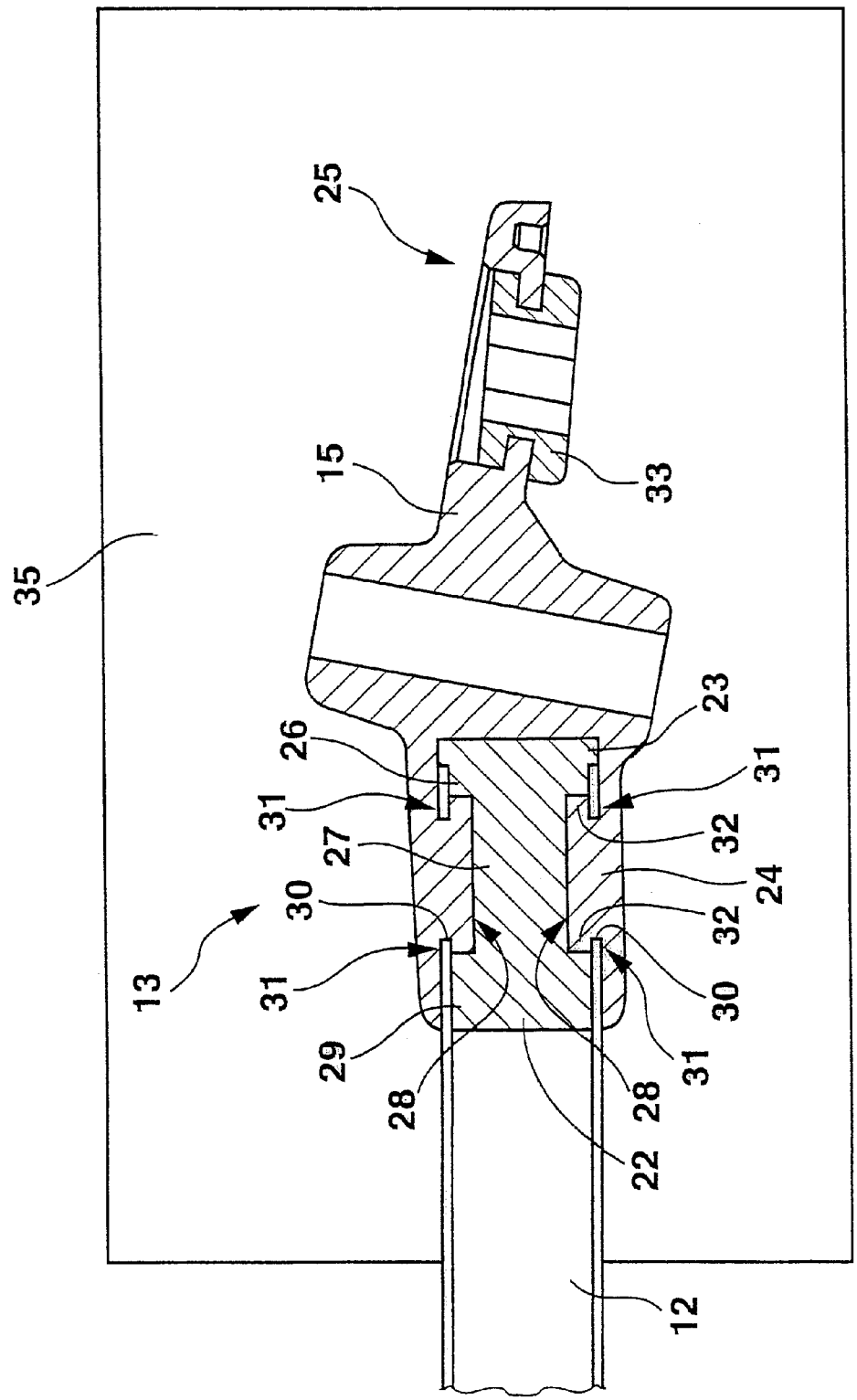
FIG. 2 is a longitudinal section through one end of a mounting tube in a first exemplary embodiment.

FIG. 2 shows a longitudinal section through the free end 13 of the mounting tube 12, which is part of the tube mounting 11. It can be seen from FIG. 2 that a sealing plug 22 is inserted with a collar 23 into an end opening of the mounting tube and rests sealingly there with its collar 23. The bearing 15 is extruded around this free end 13 of the mounting tube 12 and is joined to the mounting tube 12 by an approximately tubular extension 24. A bearing eyelet 25 is integrally joined to the bearing 15, and by way of it the bearing 15 is additionally braced on the vehicle body and can be screwed to it thereby.

The collar 23 of the sealing plug 22 is followed by a first portion 26, which corresponds to an inner contour of the mounting tube 12 and rests sealingly against this inner contour. This first portion 26 of the sealing plug 22 is followed by a second portion 27, whose cross-sectional area is reduced, compared to the cross-sectional area of the first portion 26, by one or more recesses 28 recessed from the circumference. One example of a suitable form of the recess is an annular groove form. The second portion 27 of the sealing plug 22 is followed by a third portion 29, which like the first portion 26 corresponds to the inner contour of the mounting tube 12 and rests sealingly against it. The purpose of the sealing faces between the sealing plug 22 and mounting tube 12 is to allow injection molding composition during the injection molding operation to flow only into the appropriate regions. This applies particularly to the sealing of the third portion 29, which prevents an inflow of sealing composition into the region downstream of it in the mounting tube 12.

As seen from FIG. 2, the mounting tube 12 is provided at at least one point, in the region of sealing plug 22, with a hole 30. The holes 30 shown in the drawing are disposed in the region of the second portion 27 of the sealing plug 22. A further property of the holes 30 is that the axial inside clearance of the holes 30 is less than that of the groovelike recesses 28. If under the stated conditions the one or more recesses 28 are located directly below one or more holes 30, then the result is at least portions of the respective edge 31 of the hole that protrude past the recesses 28 and thus form undercuts 32. The injection molding composition located in these undercuts 32 and solidified there thus forms a securing element.

In the bearing eyelet 25 integrally joined to the bearing 15, there is a damping element 33, which is received by positive engagement by the bearing eyelet 25. As shown in FIG. 2, the damping element 33 for receiving the securing element is injected into the bearing eyelet 25.

Figure 3:
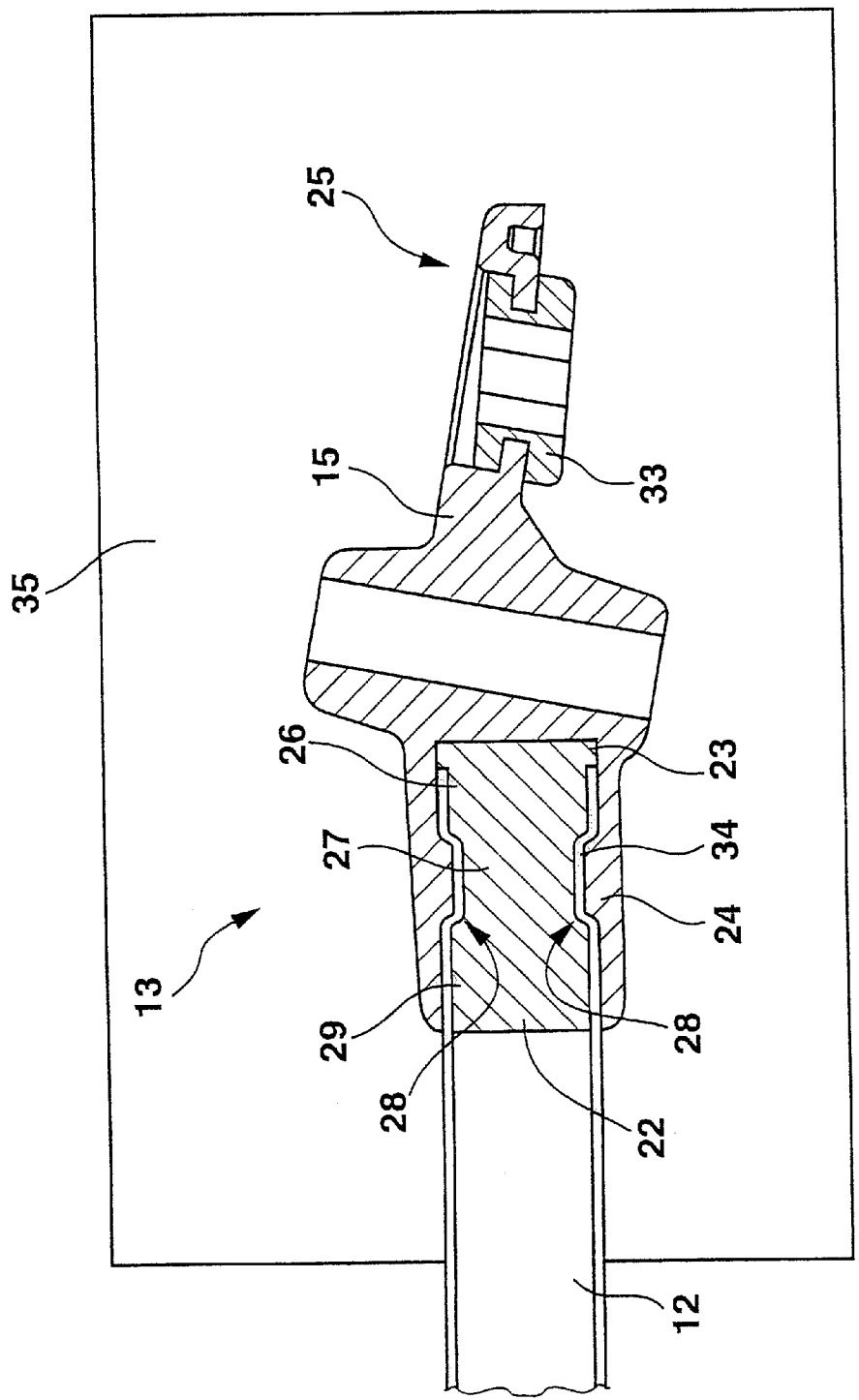
FIG. 3 is a longitudinal section through one end of a mounting tube in a further exemplary embodiment.

In FIG. 3, on advantageous variant of the connection according to the invention between the bearing 15 and one of the free ends 13 of the mounting tube 12 can be seen. Here the sealing plug 22 is placed with its collar 23 extending up to the end face of the mounting tube 12. The sealing plug 22 is embodied as presented in FIG. 2. Unlike the variant claimed with regard to FIG. 2, two opposed portions 34 of the mounting tube 12 are deformed in such a way that the portion or portions 34 rest at least partly on the surface of the recesses 28 of the sealing plug. As in the variant already presented in FIG. 2, once again the closed mounting tube 12 is surrounded by the extruded bearing 15. The bearing eyelet 25 claimed with regard to FIG. 2 and having the damping element 33 is provided here as well.

In a departure from the variant shown in FIG. 2, a sealing plug 22 without a collar 23 is also conceivable here. In that case, the sealing plug 22 must rest so firmly against the inner contour of the mounting tube 12, before the mounting tube wall is indented, that any unintentional slipping is prevented.

By means of the variants, presented in FIG. 2 and FIG. 3, of the connection according to the invention between the bearing 15 and mounting tube 12, or tube mounting 11, both free ends 13 or 14 and their sealing plug 22 are embodied in such a way that they are positively joined to the extruded bearing 15 to protect against being torn off and/or twisted.

The mounting tube 12 is suitably manufactured from metal, and both the bearing 15 and the sealing plug 22 are substantially of plastic. A metal version for the bearing 15 and the sealing plug 22 is also possible, and in particular this applies to the sealing plug 22 with a view to the requisite strength and rigidity to withstand the injection pressure load, since the sealing plug 22 braces the mounting tube 12 from inside against the injection pressure. For the damping element 33, the use of a thermoplastic, thermosetting plastic or elastomer plastic is possible.

The method for producing the nonpositive and/or positive connection according to the invention between the bearing 15 and the mounting tube 12 proceeds as follows. To produce the variant presented in FIG. 2, first the mounting tube 12, before the closure by the sealing plug 22, should be perforated at least once each on the circumference in the region of the sealing plug 22 on its at least one free end 13 or 14. After that, the mounting tube 12 should be closed with the sealing plug 22, and then placed together with it in a mold 35. The mold 35 is then closed, and the free end 13 or 14 of the mounting tube 12 is spray-coated with the injection molding composition, so that the bearing 15 with the bearing eyelet 25 is formed on.

For producing the variant of FIG. 3, the unperforated mounting tube 12 should first be closed on its free end 13 or 14 by the sealing plug 22. Next, the portions 34 of the mounting tube 12 are deformed such that they rest at least partly on the surface of the recesses 28 of the sealing plug 22. This closed and deformed end of the mounting tube 12 is then also placed in the mold 35 and after the closure of the mold 35 is spray-coated with the injection molding composition, and the bearing 15 is thus formed on.

A thermoplastic, which remains shape-stable even at temperatures of over 100° C., should preferably be used as the injection molding composition.

What is claimed is:

1. A tube mounting of a windshield wiper system of motor vehicles, comprising:
   a mounting tube (12) having a hollow profile, wherein said mounting tube has free ends and wherein on at least one of the free ends has a bearing (15) of injectable solidifying material for receiving a wiper shaft, the bearing (15) being extruded onto the at least one free end (13) of the mounting tube (12), wherein the mounting tube (12) is closed on the at least one free end (13) by a sealing plug (22).

2. The tube mounting of claim 1, wherein the sealing plug (22) has a collar (23), wherein the collar closes the at least one free end (13) of the mounting tube (12).

3. The tube mounting of claim 2, wherein the collar (23) of the sealing plug (22) is disposed proximate to a first portion (26), wherein said first portion corresponds to an inner contour of the mounting tube (12) and rests sealingly against this contour.

4. The tube mounting of claim 3, wherein the first portion (26) is disposed proximate to a second portion (27); wherein a cross-sectional area of the second portion is reduced, compared with a cross-sectional area of the first portion (26), by one or more recesses (28) recessed away from a circumference of the mounting tube.

5. The tube mounting of claim 4, wherein the second portion (279) of the sealing plug (22) is disposed proximate to a third portion (29), wherein said third portion corresponds to the inner contour of the mounting tube (12) and rests sealingly on the contour.

6. The tube mounting of claim 5, wherein portions (34) of the mounting tube (12) are deformed such that the portions (34) rest at least partly on a surface of the recesses (28).

7. The tube mounting of claim 5, wherein the sealing plug (22) is at least long enough that with the third portion (29), the sealing plug (22) ends at a same axial position of the mounting tube (12) as an extension (24) of the bearing (15).

8. The tube mounting of claim 4, wherein the second portion (27) is an annular groove.

9. The tube mounting of claim 4, wherein at least one hole (30) in the region of the second portion (27) of the sealing plug (22) has a smaller axial inside clearance than the one or more recesses (28), and wherein when the sealing plug (22) rests on a face end with the collar (23) on the free end (23), at least portions of at least one edge (31) of the at least one hole protrude past the recesses (28), thereby forming undercuts (32) for receiving a securing element comprising the injectable solidifying material of the bearing (15).

10. The tube mounting of claim 1, wherein the mounting tube (12) has at least one hole (20) on a circumference of the mounting tube in a region of the sealing plug on the at least one free end.

11. The tube mounting of claim 1, wherein the bearing (15) has a bearing eyelet (25).

12. The tube mounting of claim 11, wherein the bearing eyelet (25) receives a damping element (33).

13. The tube mounting of claim 12, wherein the bearing eyelet receives the damping element by means of injection.

14. The tube mounting of claim 1, wherein the at least one free end (13) and the sealing plug (22) are embodied such that they are positively joined to bearing (15) to secure against being pulled off and/or twisted.

15. The tube mounting of claim 1, wherein the mounting tube (12) comprises metal, and both the bearing (15) and the sealing plug (22) substantially comprise plastic.

16. A method for producing a nonpositive and/or positive connection between a bearing (15), for receiving a wiper shaft, comprising the following steps;
   providing a mounting tube having a hollow profile and a free end;
   closing at least one free end (13) of the mounting tube (12) with a sealing plug (22);
   placing the at least one free end in a mold and closing the mold;
   spray coating the at least one free end with an injection molding composition to form a bearing thereon, thereby producing a nonpositive and/or positive connection between the bearing and the at least one free end.

17. The method of claim 16, wherein the mounting tube (12) is perforated at least once on the at least one free end (23) on a circumference in the region of the sealing plug (22) before being closed by the sealing plug (22).

18. The method of claim 16, wherein before the at least one free end (13), closed by the sealing plug 922), of the mounting tube (12) is placed in the mold (35), portions (34) of the mounting tube (12) are deformed in such a way that the portions (34) rest at least partly on a surface of recesses (28) of the sealing plug (22).

* * * * *